United States Patent [19]

Schroeder et al.

[11] Patent Number: 5,671,606
[45] Date of Patent: Sep. 30, 1997

[54] METHOD AND APPARATUS FOR SENSING AND CONTROLLING THE LEVEL OF ICE IN AN ICE DISPENSER

[75] Inventors: Alfred A. Schroeder; Bennet G. Credle; Richard L. Laughlin; Thomas J. Chadwell, all of San Antonio, Tex.

[73] Assignee: Lancer Corporation

[21] Appl. No.: 529,551

[22] Filed: Sep. 18, 1995

[51] Int. Cl.⁶ .............................. F25C 1/00; G06M 7/00
[52] U.S. Cl. .............................. 62/137; 73/293; 250/221
[58] Field of Search ............................ 62/137, 344, 140; 73/293, 149; 250/221, 206

[56] References Cited

U.S. PATENT DOCUMENTS

| | | | |
|---|---|---|---|
| 3,246,210 | 4/1966 | Lorenz | 62/137 X |
| 3,534,351 | 10/1970 | Harnden, Jr. et al. | 250/221 X |
| 3,605,082 | 9/1971 | Matthews | 250/221 X |
| 3,739,177 | 6/1973 | Ko | 250/206 |
| 3,816,745 | 6/1974 | Primm et al. | 250/221 |
| 3,908,441 | 9/1975 | Virloget | 73/293 X |
| 3,961,495 | 6/1976 | Beauvent et al. | 62/140 |
| 4,109,481 | 8/1978 | Peek | 62/140 |

FOREIGN PATENT DOCUMENTS 0476738  8/1991  European Pat. Off. ................ 62/137

*Primary Examiner*—William E. Wayner
*Attorney, Agent, or Firm*—Donald R. Comuzzi; Christopher L. Makay

[57] ABSTRACT

An apparatus for monitoring and controlling the level of ice in an ice storage container includes an emitter mounted within the ice storage container and a detector mounted directly opposite from the emitter. A pulse circuit drives the emitter such that it outputs a pulse train that triggers the detector. A receiver circuit outputs a signal responsive to the detection of the pulse train by the detector. A controller activates an ice maker responsive to the output of the receiver circuit.

10 Claims, 9 Drawing Sheets

METHOD AND APPARATUS FOR SENSING AND CONTROLLING THE LEVEL OF ICE IN AN ICE DISPENSER

BACKGROUND OF THE INVENTION

The present invention relates to ice making, ice storage, and ice dispensing equipment and, more particularly, but not by way of limitation, to a method and apparatus for monitoring and controlling the level of ice in an ice storage container.

An ice level control system will require a device capable of providing a signal indicating the level of ice in an ice storage container. Such a device may be formed from an emitter/detector pair wherein the emitter outputs an infrared beam sensed by the detector. When the detector senses the beam, the ice level is below the emitter/detector pair which indicates that insufficient ice resides in the ice storage container. Conversely, when the detector does not sense the beam, the ice level is above the emitter/detector pair which indicates that sufficient ice resides in the ice storage container.

When choosing an emitter/detector pair for use in an ice level control system, the most important factors are cost and size. Unfortunately, low cost, small size emitter/detector pairs presently cannot be employed in ice level control systems because the signal strength of the infrared beam output from the emitter is insufficient to span the ice storage container and, therefore, is not sensed by the detector. More powerful emitter/detector pairs do exist, however, those emitter/detector pairs are cost prohibitive. Accordingly, a method and apparatus that will permit the use of low cost, small size emitter/detector pairs will significantly improve current ice level control systems.

SUMMARY OF THE INVENTION

In accordance with the present invention, an apparatus for monitoring and controlling the level of ice in an ice storage container includes an emitter mounted within the ice storage container and a detector mounted directly opposite from the emitter. A pulse circuit drives the emitter such that it outputs a pulse train that triggers the detector. A receiver circuit outputs a signal responsive to the detection of the pulse train by the detector. A controller activates an ice maker responsive to the output of the receiver circuit.

The apparatus further includes a second emitter mounted within the ice storage container and a second detector mounted directly opposite from the second emitter. A second pulse circuit drives the second emitter such that it outputs a pulse train that triggers the second detector. A second receiver circuit outputs a signal when the second detector fails to detect the pulse train. The controller deactivates the ice maker responsive to the output of the second receiver circuit.

The pulse circuits each include a timer configured to generate a pulse train signal, an invertor for inverting the pulse train signal, and a power transistor for amplifying the pulse train signal. By including the pulse circuit, the apparatus utilizes low cost, small size emitters because the signal strength of the generated pulse train is sufficient to span an ice storage container.

The receiver circuits each include an amplifier for amplifying the pulse train signal detected by the detector, a multivibrator configured to output a first signal responsive to the input of the pulse train wherein, when the multivibrator fails to detect the pulse train for a predetermined time period, it outputs a second signal, and a switch responsive to the first and second signals output by the multivibrator. The use of the pulse train facilitates the use of the receiver circuits which monitor the detectors and only transition when the pulse train has been interrupted for a predetermined period.

It is, therefore, an object of the present invention to provide a method and apparatus that permits the use of low cost, small size emitter/detector pairs by employing a pulse train to power the emitters.

Still other objects, features, and advantages of the present invention will become evident to those skilled in the art in light of the following.

DETAILED DESCRIPTION OF THE PREFERRED EMBODIMENT

Figure 1:
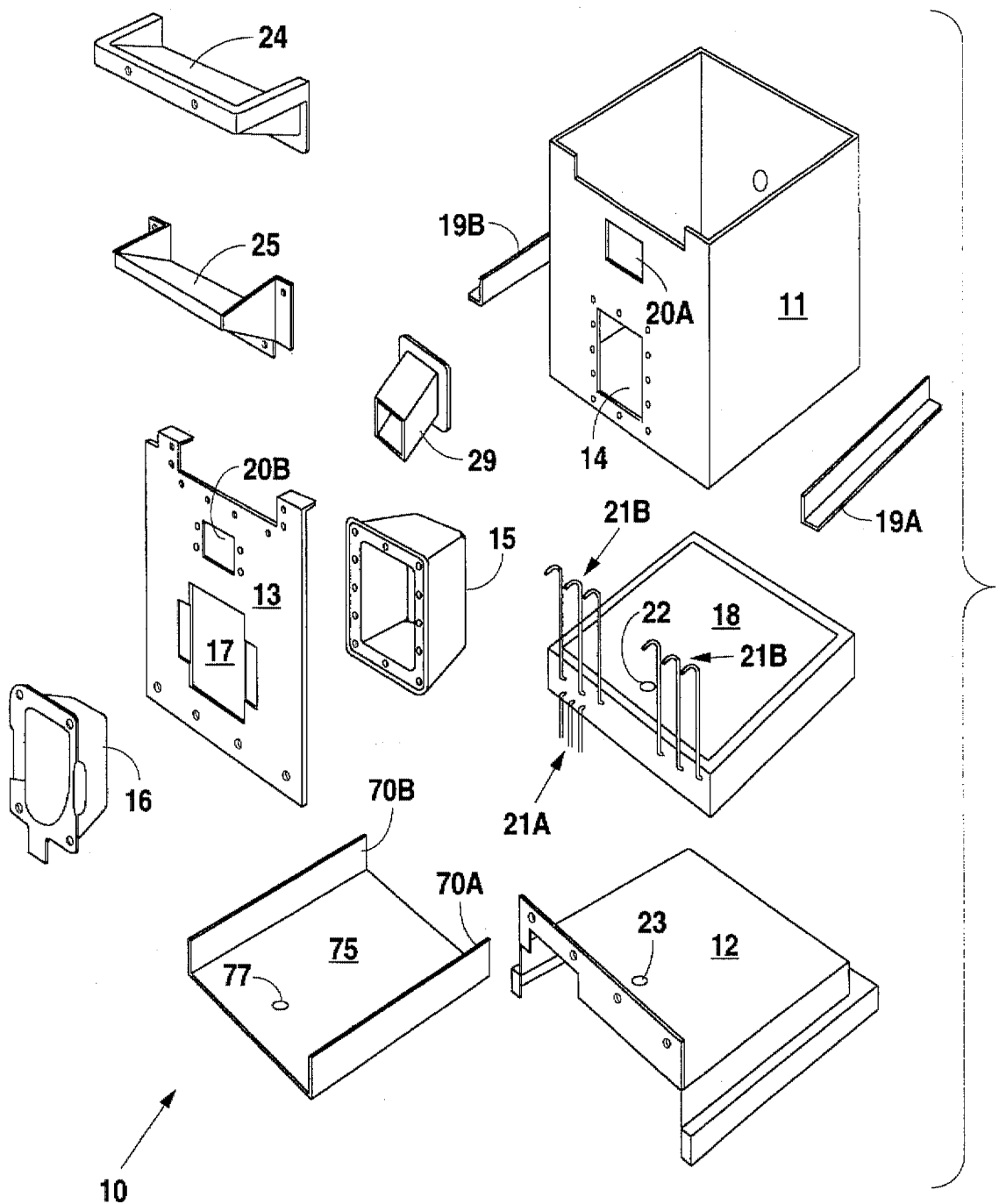
FIG. 1 is an exploded perspective view illustrating the assembly of the bin liner for either the ice dispenser or combination ice and beverage dispenser.
Figure 6:
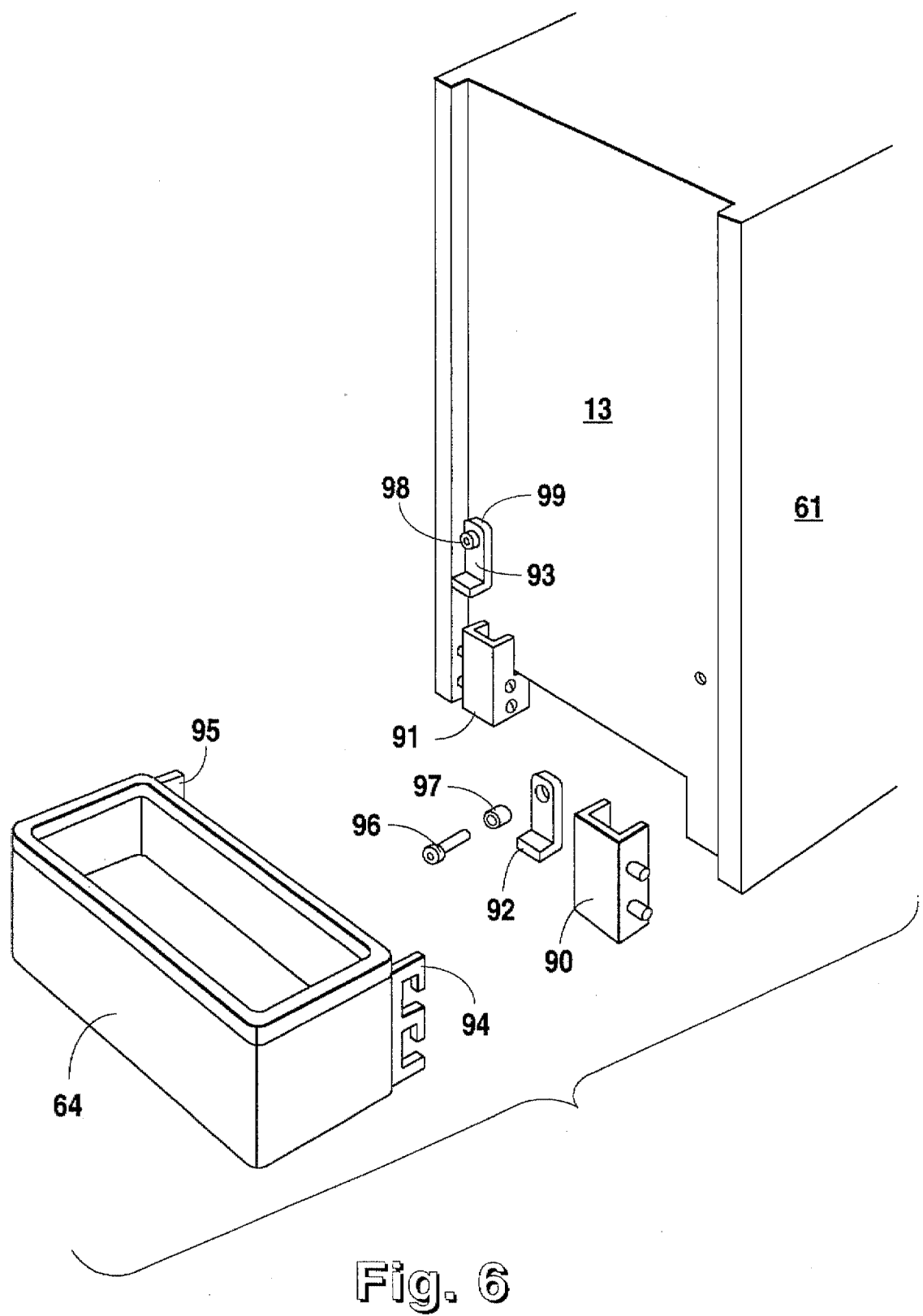
FIG. 6 is a perspective view illustrating the mounting of the drip tray onto the either the ice dispenser or combination ice and beverage dispenser.
Figure 7:
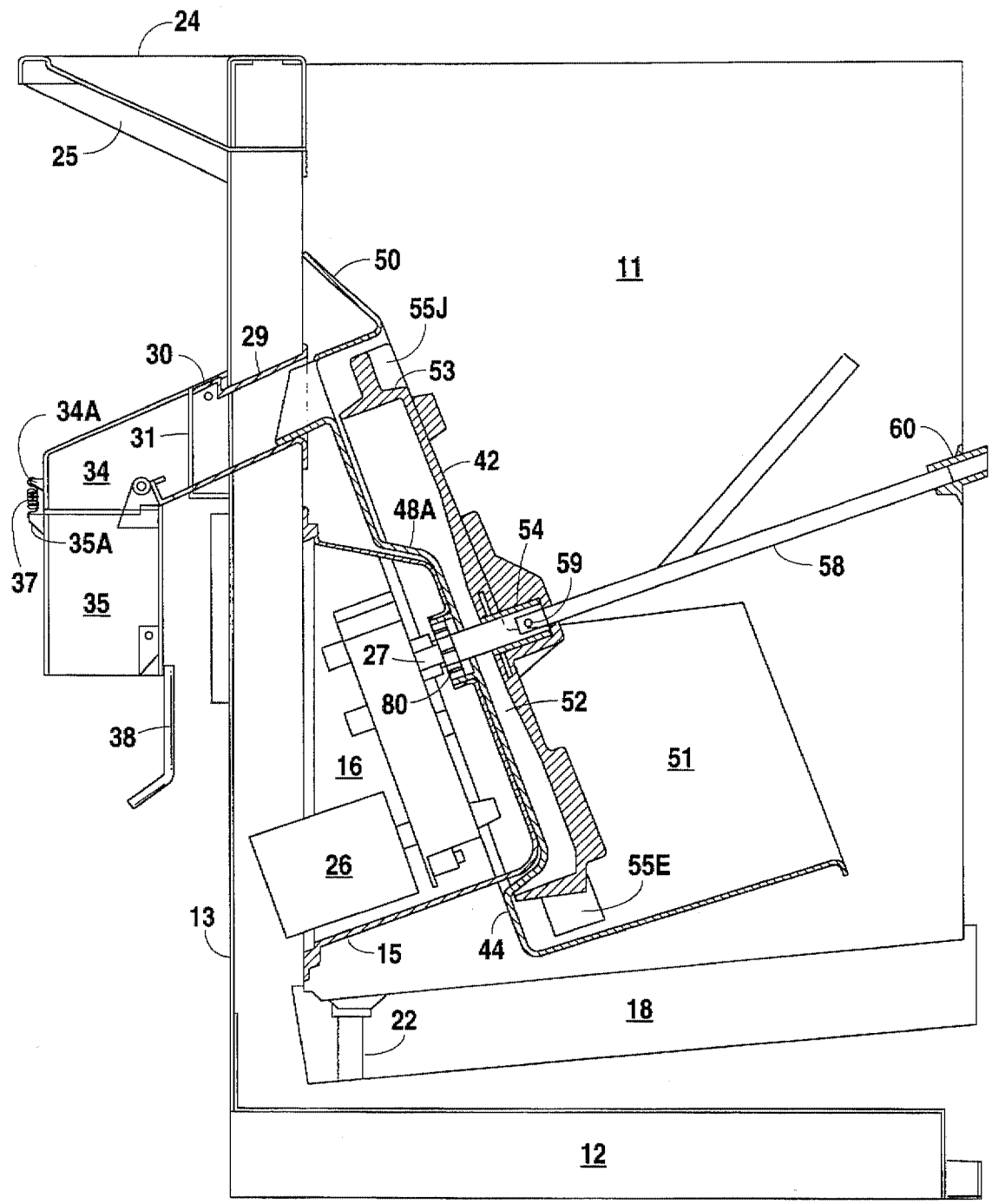
FIG. 7 is a side plan view in cross-section illustrating a partially assembled combination ice and beverage dispenser.

With reference to FIGS. 1–8, an ice dispenser and a combination ice and beverage dispenser utilizing the ice level sensing and control system of this preferred embodiment will be described. As illustrated in FIGS. 1 and 7, dispensing apparatus 10 includes liner 11, base 12, and mounting plate 13. Mounting plate 13 connects to base 12 using any suitable means such as screws or nuts and bolts. Liner 11 includes opening 14 to receive shroud 15 therein. Shroud 15 mounts to liner 11 using any suitable means such as screws or nuts and bolts. Insert shroud 16 resides within shroud 15 and their attachment permits the mounting of liner 11 onto mounting plate 13. Although liner 11 mounts onto mounting plate 13, shroud 15 spaces liner 11 and mounting plate 13 apart to create a gap therebetween that holds insulating foam. Once shroud 15 has been secured in opening 14, mounting plate 13 is placed against shroud 15 followed by the placement of insert shroud 16 through opening 17 into shroud 15. Insert shroud 16 is then secured to shroud 15 using any suitable means such as screws or nuts and bolts to affix liner 11, shroud 15, mounting plate 13, and insert shroud 16 together.

Dispensing apparatus 10 includes chute 29 to provide a discharge passageway. Consequently, chute 29 spans the gap between liner 11 and mounting plate 13 to permit the communication of ice exterior to dispensing apparatus 10. Chute 29 fits through opening 20A of liner 11 and opening 20B of mounting plate 13. Chute 29 includes a lip that abuts the interior of liner 11 about opening 20A to prevent the dislodging of chute 29 from within openings 20A and B.

If dispensing apparatus 10 dispenses only ice, it includes plate 75 having sides 76A and B. Sides 76A and B attach to liner 11 using any suitable attachment means such as screws or nuts and bolts to secure plate 75 within liner 11. The sidewalls of liner 11 slope downwardly from the rear wall to the front wall so that the connection of plate 75 to liner 11 results in plate 75 residing at an angle sloping toward the front wall of liner 11. Plate 75 resides at an angle sloping toward the front wall of liner 11 (approximately 5 degrees in this preferred embodiment) to facilitate the drainage of water off plate 75. Furthermore, plate 75 includes drain hole 77 that communicates with drain hole 23 of base 12 so that any water accumulating on plate 75 may be drained from dispensing apparatus 10.

If dispensing apparatus 10 dispenses both ice and beverages, plate 75 is replaced with cold plate 18. Cold plate 18 is a standard cold plate including inlet lines 21A that connect to a beverage source and outlet lines 21B that connect to dispensing valves to allow the dispensing of beverages. Cold plate 18 attaches to liner 11 using brackets 19A and B and any suitable attachment means such as screws or nuts and bolts. The sidewalls of liner 11 slope downwardly from the rear wall to the front wall so that the connection of cold plate 18 to liner 11 results in cold plate 18 residing at an angle sloping toward the front wall of liner 11. Cold plate 18 resides at an angle sloping toward the front wall of liner 11 (approximately 5 degrees in this preferred embodiment) to facilitate the drainage of water off cold plate 18. Furthermore, cold plate 18 includes drain hole 22 that communicates with drain hole 23 of base 12 so that any water accumulating on cold plate 18 may be drained from dispensing apparatus 10.

Dispensing apparatus 10 includes tray 24 that connects to liner 11 using bracket 25 and any suitable attachment means such as screws or nuts and bolts. Tray 24 provides a platform that supports a container holding ice during the dumping of ice into dispensing apparatus 10.

Figure 2:
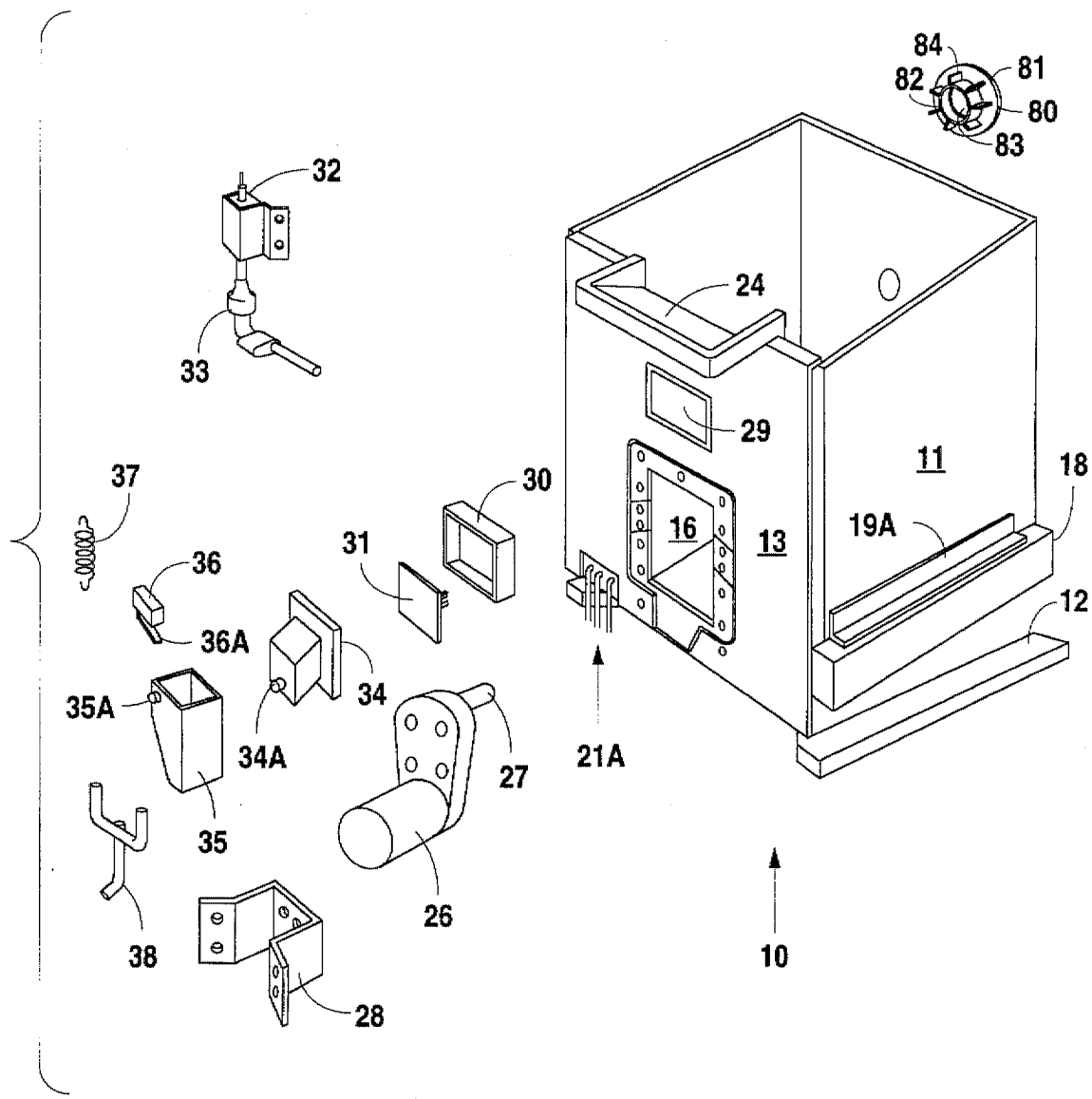
FIG. 2 is an exploded perspective view illustrating the dispensing wheel drive system.

As illustrated in FIGS. 2 and 7, dispensing apparatus 10 includes gear motor 26 that resides in the cavity defined by insert shroud 16. Gear motor 26 mounts within insert shroud 16 using bracket 28 and any suitable attachment means such as screws or nuts and bolts. Both insert shroud 16 and shroud 15 include openings therethrough to permit shaft 27 of gear motor 26 to protrude into liner 11. A locking bearing (not shown) mounts within the openings through insert shroud 16 and shroud 15 using any suitable means such as an adhesive to provide a holder for seal 80. Seal 80 includes flange 81 and cylindrical portion 82 having opening 83 therethrough that receives shaft 27 of gear motor 26. Seal 80 includes splines 83, while the locking bearing includes matching grooves that receive splines 83 to lock seal 80 within the locking bearing. Dispensing apparatus 10 includes seal 80 to prevent water and ice from escaping liner 11 through the openings in insert shroud 16 and shroud 15 necessary to permit shaft 27 to protrude into liner 11.

Dispensing apparatus 10 includes door frame 30, door 31, chute 34, and tube chute 35 to direct ice travelling through chute 29 into a container. Door frame 30 fits within over the outlet from chute 29 and connects to mounting plate 13 using any suitable means such as screws or nuts and bolts. Door 31 pivotally attaches within door frame 30 using a pivot pin (not shown) to prevent the discharge of ice except during the activation of dispensing apparatus 10. Chute 34 fits over door frame 30 and connects to mounting plate 13 using any suitable means such screws. Tube chute 35 pivotally connects to the underside of chute 34 using brackets and pivot pins (not shown) to provide the outlet for ice discharged from dispensing apparatus 10.

Solenoid 32 attaches to mounting plate 13 using any suitable means such screws and is coupled to door 31 via lever 33 to control the opening and closing of door 31. Switch 36 mounts to the front of chute 34 using any suitable means such as screws to control the activation of solenoid 32 and gear motor 26. Switch 36 includes contactor 36A that abuts protrusion 35A of tube chute 35. When tube chute 35 is pivoted, protrusion 35A moves away from switch 36 thereby releasing contactor 36A which facilitates the activation of switch 36. Spring 37 connects between protrusion 34A of chute 34 and protrusion 35A of tube chute 35 to provide a restoring force against the pivoting of tube chute 35. Lever 38 mounts at the lower rear portion of tube chute 35 using any suitable means such as pins (not shown) to provide a tube chute pivot point accessible to a user.

Figure 3:
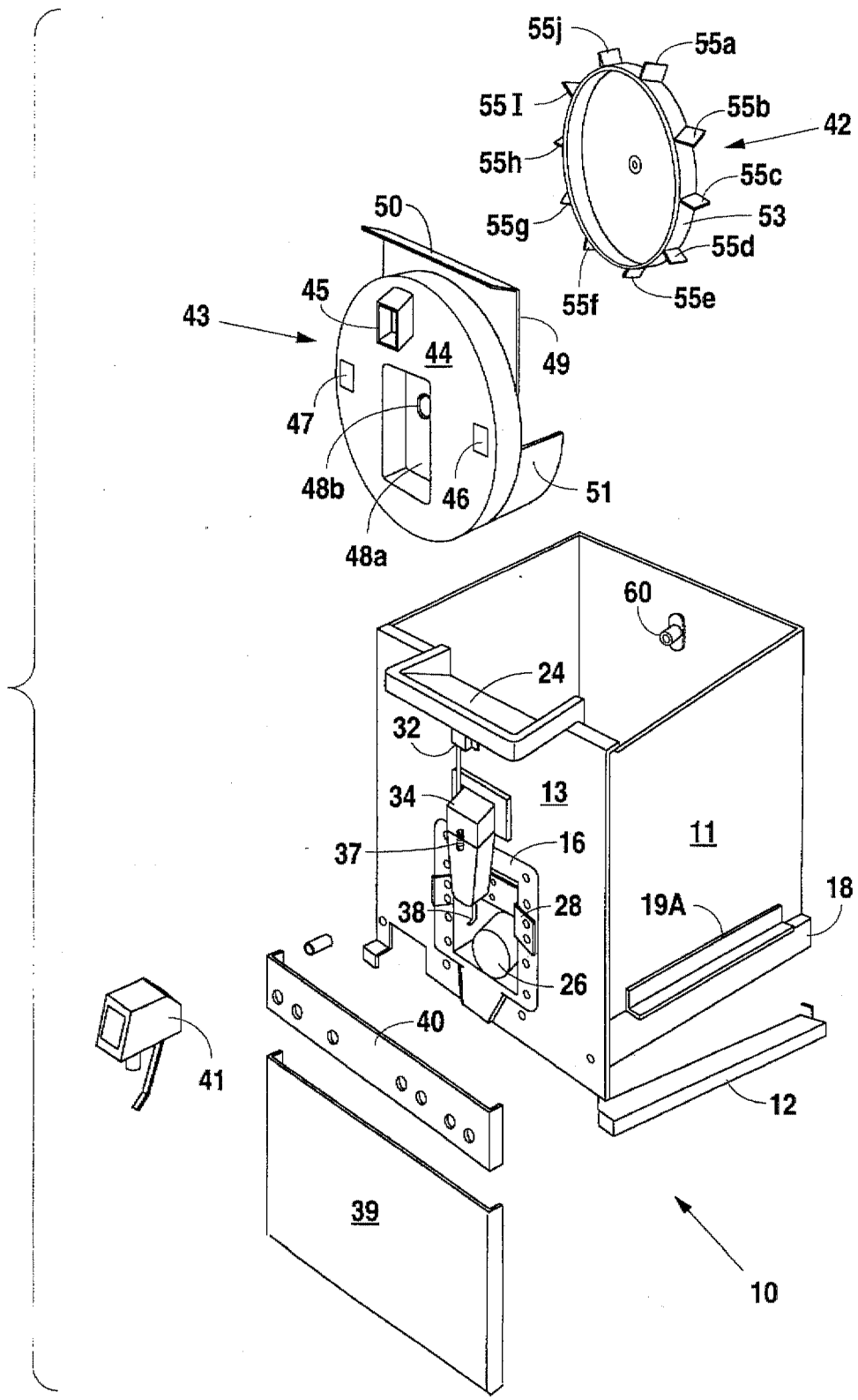
FIG. 3 is an exploded perspective view illustrating the dispensing wheel and dispensing wheel shroud.

As illustrated in FIG. 3, dispensing apparatus 10 includes splash plate 39 that attaches to wrapper 61 (see FIG. 4) using any suitable means such as screws to prevent dispensed beverages from contacting gear motor 26. Faucet plate 40 attaches to mounting plate 13 using any suitable means such as screws to provide a connection point for the dispensing valves referenced generally with numeral 41 (see FIG. 4).

Figure 8:
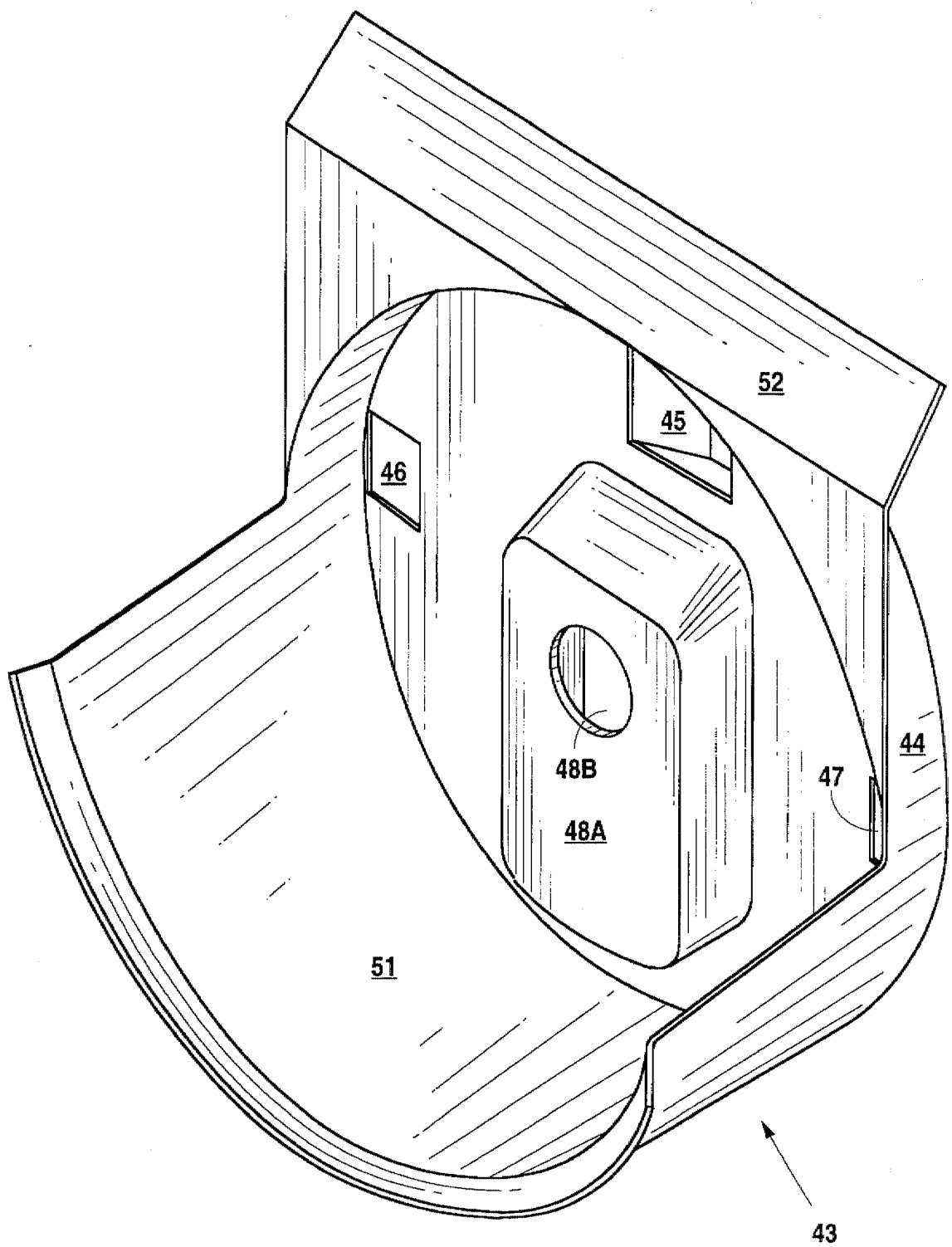
FIG. 8 is a perspective view illustrating the dispensing wheel shroud.

As illustrated in FIGS. 3, 7, and 8, dispensing apparatus 10 includes wheel 42 and shroud 43 to facilitate the dispensing of ice from dispensing apparatus 10. Shroud 43 includes cylindrical portion 44 that defines a recess in which wheel 42 resides. Cylindrical portion 44 includes chute 45 and openings 46 and 47 therethrough. Cylindrical portion 44 further includes depression 48A having opening 48B therethrough. Chute 45 and depression 48A permit the angled positioning of shroud 43 at the front wall of liner 11. Depression 48A resides around a portion of shroud 15, while chute 45 inserts into chute 29 so that shroud 43 is suspended at an angle sloping away from the top of the front wall of liner 14. Bonnet 49 extends from cylindrical portion 44 and includes lip 50 that abuts tray 24 to help support and increase the rigidity of shroud 43. Shroud 43 includes curved plate 51 extending from the lower end of cylindrical portion 44 to furnish a chute that funnels ice into the recess defined by cylindrical portion 44.

Wheel 42 includes disk 52 and annular flange 53 extending therefrom. Disk 52 includes grommet 54 formed integrally therewith to support shaft 27 of gear motor 26 which passes through opening 48B of depression 48A. Shaft 27 is coupled to grommet 54 to permit the rotary driving of wheel 42 (described herein). Wheel 42 includes paddles 55A–J to facilitate the delivery of ice to chute 45. Paddles 55A–J may be of any suitable material such as rubber, plastic, metal, etc. Paddles 55A–J fit into slots about annular flange 53 and are held in place by friction or a suitable adhesive (see FIG. 5). Alternatively, disk 52, annular flange 53, and paddles 55A–J may be molded as a single piece using any suitable material such as plastic, metal, etc. to form wheel 42.

Figure 4:
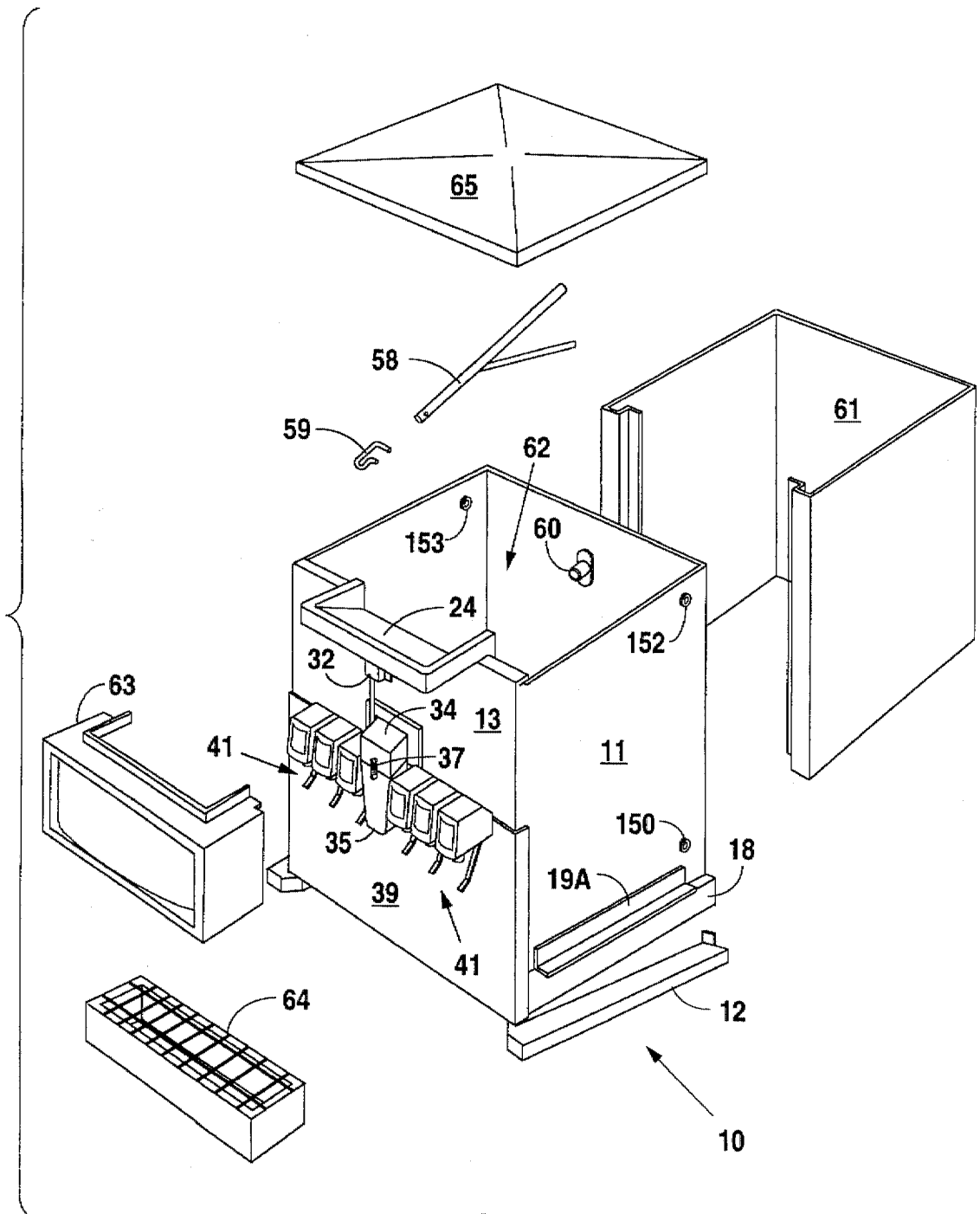
FIG. 4 is an exploded perspective view illustrating the final assembly of the ice bin and inclusion of dispensing valves for the combination ice and beverage dispenser.
Figure 5:
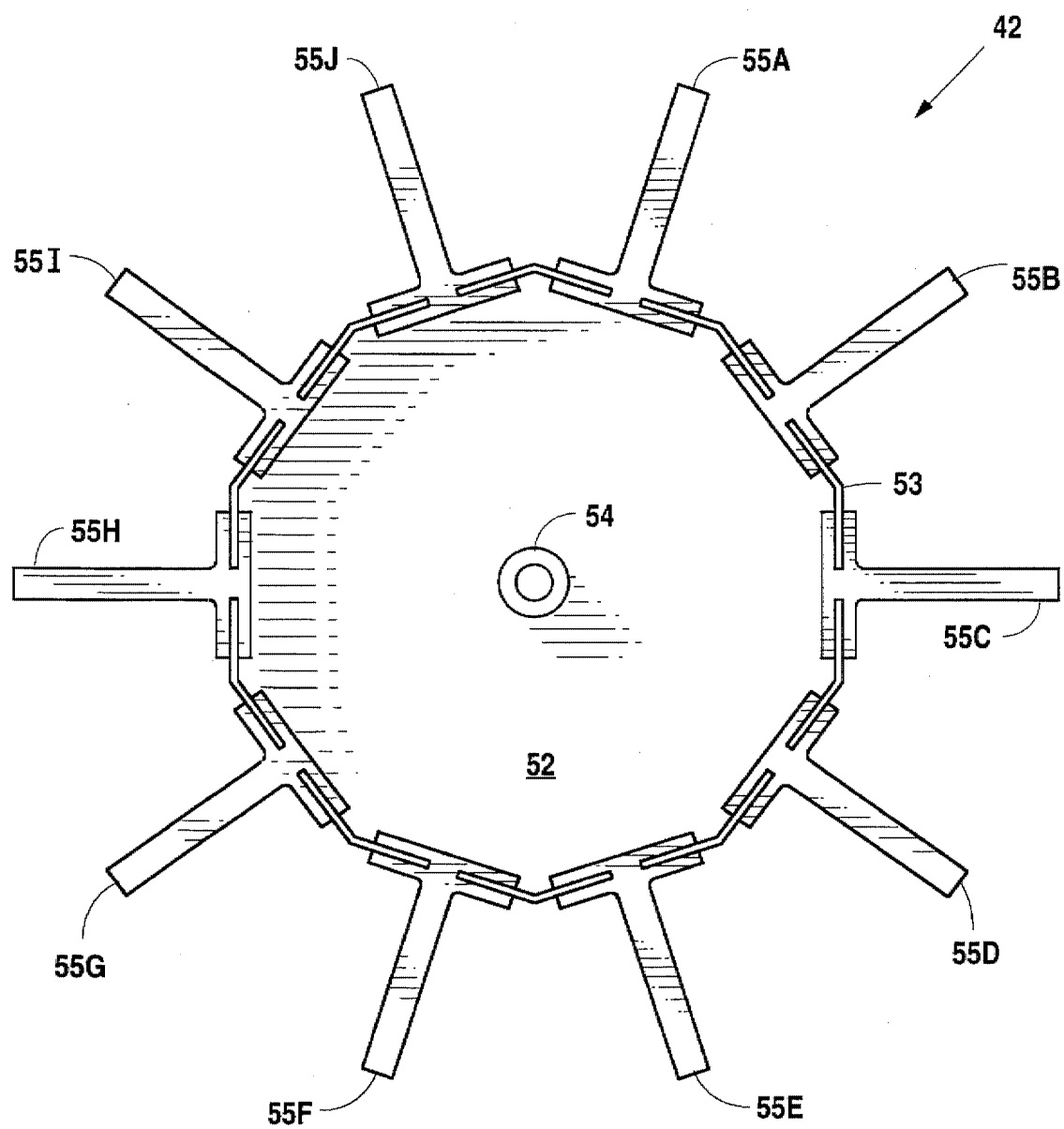
FIG. 5 is a front plan view illustrating the dispensing wheel.

As illustrated in FIGS. 4 and 7, dispensing apparatus 10 includes agitator 58 that prevents ice within dispensing apparatus 10 from freezing together. One end of agitator 58 fits within the grommet 54 of disk 52 and is secured to shaft 27 of gear motor 26 using agitator pin 59. Agitator pin 59 passes through aligned openings in grommet 54, shaft 27, and agitator 58 to couple both wheel 42 and agitator 58 to shaft 27. The opposite end of agitator 58 fits within bushing 60 to permit the rotation of agitator 58 within liner 11.

Wrapper 61 fits about liner 11 and connects to mounting plate 13 using any suitable means such as screws or nuts and bolts. An insulating foam is sprayed between liner 11, mounting plate 13, and wrapper 61 and to form an insulated water-tight bin 62 for storing ice. Merchandiser 63 attaches to mounting plate 13 above dispensing valves 41 using any suitable means such as screws or nuts and bolts. Dispensing apparatus 10 includes merchandiser 63 to provide an aesthetically pleasing appearance as well as furnish a frame for displaying advertising material.

As illustrated in FIG. 6, mounts 90 and 91 and locks 92 and 93 permit the attachment of drip tray 64 in front of mounting plate 13 below dispensing valves 41. Drip tray 64 collects spilled product and delivers it to a drain to prevent product from accumulating about dispensing apparatus 10. Drip tray 64 includes brackets 94 and 95, while mounts 90 and 91 include pins that support brackets 94 and 95. Mounts 90 and 91 attach to base 12 using any suitable means such as screws. Locks 92 and 93 attach to mounting plate 13 using respective screws 96 and 98 and bearings 97 and 99. Bearings 97 and 99 allow their respective locks 92 and 93 to swivel which facilitates the locking of drip tray 64 onto mounts 90 and 91.

To attach drip tray 64, locks 92 and 93 are first swivelled away from mounts 90 and 91, respectively. Brackets 94 and 95 are then placed onto the pins of a respective mount 90 and 91 to support drip tray 64 in front of mounting plate 13. After the placement of drip tray 64 onto mounts 90 and 91, locks 92 and 93 are swivelled over mounts 90 and 91, respectively, such that they lock brackets 94 and 95, respectively, onto mounts 90 and 91 to prevent accidental dislodgement of drip tray 64 from brackets 94 and 95.

As illustrated in FIGS. 4 and 7, emitter 150 mounts at a lower portion of one sidewall of liner 11, while detector 151 mounts on the opposite sidewall directly across from emitter 150. Similarly, emitter 152 mounts at an upper portion of one sidewall of liner 11, while detector 153 mounts on the opposite sidewall directly across from emitter 152. Emitters 150 and 152 and detectors 151 and 153 fit within holes through liner 11 and are secured therein using any suitable means such as brackets. In this preferred embodiment, emitters 150 and 152 are Honeywell Model No. SE5470-003 infra-red emitters, and detectors 151 and 153 are Honeywell Model No. SD5443-003 infra-red detectors.

Figure 9:
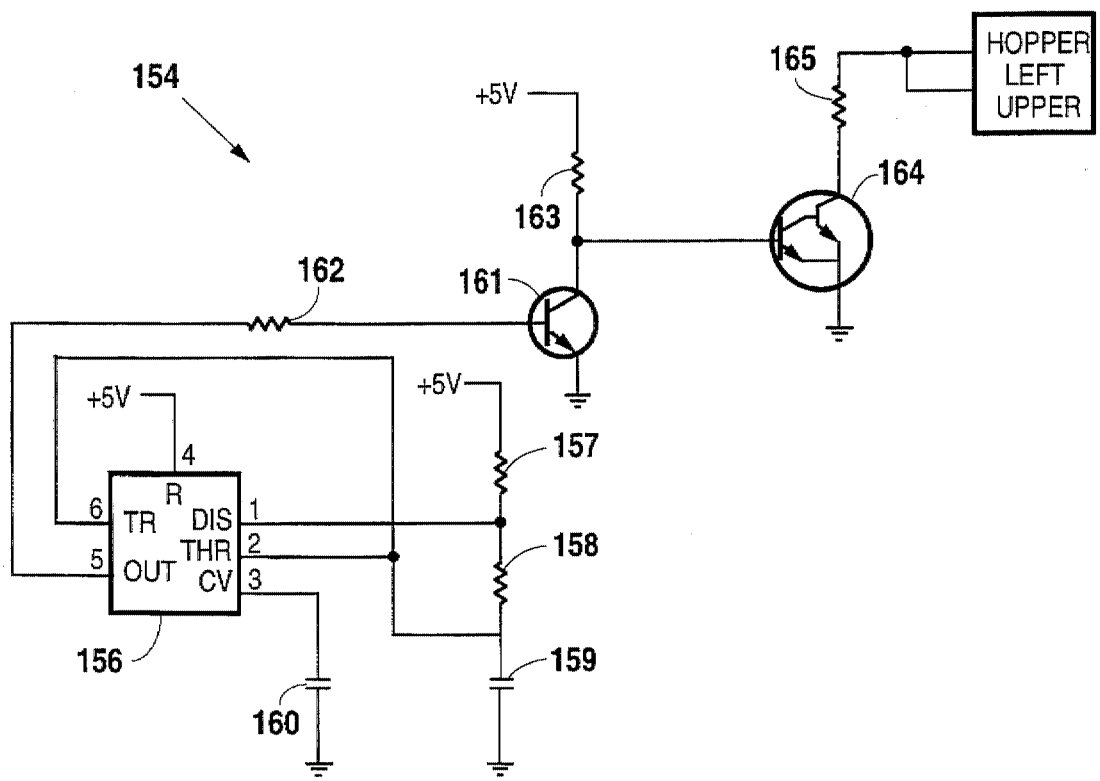
FIG. 9 is a schematic diagram illustrating the pulse circuit of the ice level monitoring and control system.
Figure 10:
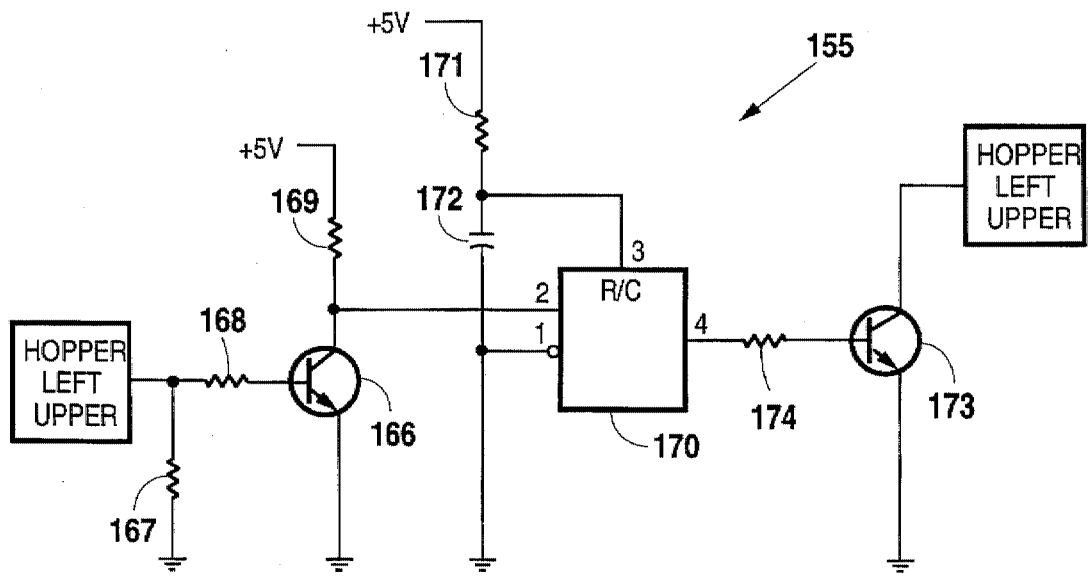
FIG. 10 is a schematic diagram illustrating the receiver circuit of the ice level monitoring and control system.

As illustrated in FIG. 9, an identical pulse circuit 154 mounts on a control board (not shown) to drive emitters 150 and 152. Similarly, as illustrated in FIG. 10, an identical receiver circuit 155 also mounts on the control board and recieves a signal from detectors 151 and 153. The control board receives power from a standard 110/120 VAC line and includes a voltage regulator to furnish the 5 VDC required for the operation of the pulse circuits 154 and receiver circuits 155.

The control board further includes a microprocessor that monitors the output from each receiver circuit and controls a relay in response thereto. When the microprocessor receives a signal indicating the ice level in bin 62 is low, it actuates the relay until it receives a signal indicating the ice bin 62 is filled. In this preferred embodiment, the microprocessor is a Microchip Model PIC16C54 microprocessor powered by the 5 VDC on the control board.

The relay is electrically coupled to an ice making machine mounted onto dispensing apparatus 10. When actuated, the relay provides power to the ice making machine so that it delivers ice into bin 62. With the ice maker in place over bin 62, tray 24 functions to allow the manual dumping of ice into bin 62 if the ice maker malfunctions or cannot replenish ice quickly enough to meet customer demand.

The pulse circuits 154 increase the signals level of a pulse train output from their respective emitters 150 and 152 by pulsing each emitter 150 and 152 with higher voltage and current (i.e., power) at a predetermined duty cycle (10% in this preferred embodiment). The pulse circuits 154 each include an LM566 timer 156 configured in an astable mode of operation and powered by the 5 VDC input from the control board at pin 4. Resistors 157 and 158 and capacitor 159 connect between the 5 VDC and a reference potential (e.g., ground) and further connect to threshold pin 2 and trigger pin 6 to establish the on time and off time of timer 156. Discharge pin 1 connects between resistors 157 and 158 to provide capacitor 159 with a discharge path when timer 156 is on. Control voltage pin 3 connects to the reference potential via capacitor 160 to set the level of the threshold voltage, while pin 5 is the output pin.

In operation, capacitor 159 charges through resistors 157 and 158 at the rate set by the values of those two resistors. As long a capacitor 159 has a level of charge below the threshold level, trigger pin 6 receives no signal and timer 156 remains off. Once capacitor 159 reaches the threshold voltage, trigger pin 6 receives a signal resulting in the turning on of timer 156. With timer 156 on, capacitor 159 discharges to the reference potential through discharge pin 1. After capacitor 159 discharges, trigger pin 6 ceases to receive a signal and timer 156 turns off which begins the charging cycle of capacitor 159. Accordingly, timer 156 pulses on and off to produce a duty cycle signal on output pin 5.

Output pin 5 connects to the base of transistor 161 via resistor 162 to furnish transistor 161 with an activation signal. The collector of transistor 161 connects via resistor 163 to the 5 VDC to receive a bias voltage, and the emitter of transistor 161 connects to the reference potential. In this preferred embodiment, transistor 161 is a Model No. 2N3904 NPN transistor that inverts the pulse output from timer 156 and inputs the inverted signal to the base of transistor 164 thereby providing an activation signal. The collector of transistor 164 connects to a respective emitter 150 and 152 via current limiting resistor 165, while the emitter of transistor 164 connects to the reference potential. In this preferred embodiment, transistor 164 is a Model No. TIP120 NPN Darlington high-powered transistor that outputs an increased current and voltage to a respective emitter 150 and 152 in response to the inverted duty cycle signal output from transistor 161.

Detectors 151 and 153 each receive the infra-red pulses from their respective emitter 150 or 152 and produce a corresponding electrical pulse input into receiver circuits 155. Receiver circuits 155 include transistor 166 and resistors 167–169 to amplify the pulse train output from detectors 151 and 153. In this preferred embodiment, transistor 166 is a Model No. 2N3904 NPN transistor.

Receiver circuits 155 further include multivibrator 170 that inputs the amplified pulse train at its pin 2 to determine when ice resides between emitter 150 and detector 151 and emitter 152 and detector 153. In this preferred embodiment, multivibrator 170 is a Model No. 74LS123 retriggerable monostable multivibrator configured to output a high signal as long as it receives the amplified pulse train. Resistor 171 and capacitor 172 connect between the 5 VDC and the reference potential and further to pin 1 of multivibrator 170 to set the output from multivibrator 170 in the absence of the amplified pulse train. R/C pin 3 connects between resistor 171 and capacitor 172 to set the R/C time constant of multivibrator 170 that establishes the period during which the amplified pulse train must be interrupted before the output from multivibrator 170 changes.

In operation, as long as multivibrator 170 receives an input pulse from a respective detector 151 and 153 before the expiration of the R/C time constant, it outputs a high signal on pin 4. However, if the R/C time constant expires before the receipt of an input pulse, the connection of multivibrator 170 to resistor 171 and capacitor 172 results in multivibrator 170 transitioning to output a low signal on pin 4.

The base of transistor 173 connects to pin 4 via resistor 174 to receive the output of multivibrator 170. The collector of transistor 173 connects to the microprocessor (not shown), while its emitter connects to the reference potential. In this preferred embodiment, transistor 166 is a Model No. 2N3904 NPN transistor. When no ice resides between a respective emitter/detector pair 150 and 151 or 152 and 153, receiver circuits 155 output a low signal because transistor 173 connects the microprocessor to the reference potential. Conversely, when ice does reside between a respective emitter/detector pair 150 and 151 or 152 and 153, receiver circuits 155 output a high signal because, with transistor 173 turned off, the microprocessor is connected to the 5 VDC.

The microprocessor monitors the outputs from detectors 151 and 153 and their respective receiver circuits 155 to determine when the ice making machine must deliver ice into bin 62. During the majority of the time, ice will reside between emitter/detector pair 150 and 151. Thus, the pulse train will be interrupted resulting in the microprocessor receiving a high signal. As long as the microprocessor receives that high signal, it will not activate the ice making machine so that ice is delivered into bin 62. However, once the level of the ice in bin 62 drops below emitter/detector pair 150 and 151, the microprocessor receives a low signal indicating that ice must be placed in bin 62. Accordingly, the microprocessor outputs a signal that actuates the relay resulting in the ice making machine depositing ice into bin 62.

After receiving a low signal from detector 151 and its respective receiver circuit 155, the microprocessor will maintain the relay actuated until it receives a high signal from detector 153 and its respective receiver circuit 155. With the relay actuated, the microprocessor will monitor the output from detector 153 and its respective receiver circuit 155 to determine when ice resides between emitter/detector pair 152 and 153. As long as the microprocessor receives a low signal, it will not deactuate the relay. However, once the level of ice in bin 62 rises over emitter/detector pair 152 and 153, the pulse train is interrupted so that the microprocessor receives a high signal indicating that bin 62 is filled. Accordingly, the microprocessor outputs a signal that deactuates the relay resulting in the ice making machine ceasing to deposit ice into bin 62.

Alternatively, emitter/detector pair 152 and 153 may be removed and the ice making machine placed on a timer. In that instance, the microprocessor would activate the timer so that the ice making machine would deliver ice into bin 62 until the timer timed out.

Once bin 62 has been filled, ice dispensing may begin. The angular positions of cold plate 18 and shroud 43 within bin 62 direct ice onto curved plate 51 of shroud 43. Curved plate 51 directs the ice into the lower section of cylindrical portion 44 of shroud 43. The placement of wheel 42 in the recess defined by cylindrical portion 44 creates pockets that facilitate the lifting of ice to chute 45. Specifically, adjacent ones of paddles 55A–J, annular flange 53, and the inner surface of cylindrical portion 44 defining the recess in which wheel 42 resides produce pockets.

To activate wheel 42 and dispense ice, a user pushes lever 38 toward splash plate 39, typically with a cup. The pushing of lever 38 causes tube chute 35 to pivot toward splash plate 39 and away from switch 36. As tube chute 35 pivots away, protrusion 35A releases contactor 36A, resulting in the activation of switch 36. The activation of switch 36 permit the actuation of solenoid 32 and gear motor 26. Once activated solenoid 32 opens door 31 via lever 33 to permit the discharge of ice through chute 34 and tube chute 35 into the cup below.

Once actuated, gear motor 26 rotates wheel 42 within shroud 43 to lift ice to chute 45. Curved plate 51 directs ice into the pockets defined by wheel 42 and shroud 43 so that, as wheel 42 rotates, it lifts ice to chute 45 of shroud 43. Additionally, a portion of the ice exits shroud 43 at openings 46 and 47 to fill the front portion of bin 62 with ice. The ice within bin 62 not only provides ice for beverages but also cools beverages flowing through cold plate 18. Accordingly, ice must reside on the maximum amount of cold plate surface area to ensure beverages are dispensed at a minimum temperature. Thus, ice exiting shroud 43 via openings 46 and 47 drops in front of and onto the forward portion of cold plate 18.

As the ice reaches chute 45, it passes through chute 45 into chute 34 and then down tube chute 35 into the cup below. As long as the user presses lever 38, gear motor 26 rotates wheel 42 to facilitate the delivery of ice. However, once lever 38 is released, spring 37 pulls tube chute 35 back to its unpivoted position. As a result, protrusion 35A depresses contactor 36A to deactivate switch 36 and thus solenoid 32 and gear motor 26. With gear motor 26 deactivated, dispensing wheel 42 stops rotating to end the delivery of ice. Furthermore, the deactuation of solenoid 32 allows door 31 to close which prevents ice flow through chute 34 into tube chute 35.

In addition to rotating wheel 42, gear motor 26 rotates agitator 58. Agitator 58 travels circularly through the ice within bin 62 to break apart any ice chunks that have frozen together. Accordingly, agitator 58 ensures the ice within bin 62 remains small enough to fit within the pockets defined by wheel 42 and shroud 43. Furthermore, dispensing apparatus 10 includes a timer that periodically actuates gear motor 26 to facilitate the rotation of wheel 42 and agitator 58. However, the timer does not actuate solenoid 32 so that door 31 remains closed. Consequently, wheel 42 rotates to deliver ice at the front of bin 62 via openings 46 and 47, while agitator 58 rotates to prevent ice within bin 62 from freezing together.

For the combination ice and beverage dispenser, a user may dispense a beverage after receiving a cup of ice. The user depresses a lever of one of dispensing valves 41 which opens to permit beverage to flow from cold plate 18 into the cup via the opened dispensing valve. The dispensed product may be any suitable beverage such as a fruit drink or carbonated soda water formed by mixing a beverage syrup with water or carbonated water at dispensing valves 41. Consequently, cold plate 18 connects to any suitable remote beverage source such as a bag in a box or "figal" along with a carbonated water and plain water source.

Although the present invention has been described in terms of the foregoing embodiment, such description has been for exemplary purposes only and, as will be apparent to one of ordinary skill in the art, many alternatives, equivalents, and variations of varying degrees will fall within the scope of the present invention. That scope, accordingly, is not to be limited any in respect by the foregoing description, rather, it is defined only by the claims which follow.

We claim:

1. An apparatus for monitoring and controlling the level of ice in an ice storage container, comprising:
   an emitter mounted within the ice storage container;
   a detector mounted within the ice storage container directly opposite from said emitter;
   a pulse circuit for applying a duty cycle signal to said emitter wherein said duty cycle signal permits the application of increased power to said emitter to increase the signal level of a pulse train output by said emitter, said pulse circuit comprising:
      a timer configured to generate a pulse train signal,
      an invertor for amplifying the pulse train signal, and
      a power transistor for amplifying the pulse train signal; and
   a receiver circuit for outputting a signal responsive to the pulse train detected by said detector.

2. The apparatus according to claim 1 further comprising a controller that activates an ice maker responsive to the signal output from said receiver circuit.

3. The apparatus according to claim 2 further comprising:
   a second emitter mounted within the ice storage container;
   a second emitter mounted within the ice storage container directly opposite from said second emmiter;
   a second pulse circuit for applying a duty cycle signal to said emitter wherein said duty cycle signal permits the application of increased power to said emitter to increase the signal level of a pulse train output by said emitter; and
   a second receiver circuit for outputting a signal when said detector fails to detect the pulse train.

4. The apparatus according to claim 3 wherein said controller deactivates the ice maker responsive to the signal output from said second receiver circuit.

5. The apparatus according to claim 1 wherein said receiver circuit comprises:
   an amplifier for amplifying the pulse train signal detected by said detector;
   a multivibrator configured to output a first signal responsive to the input of the pulse train wherein, when said multivibrator fails to detect the pulse train for a predetermined time period, said multivibrator outputs a second signal; and
   a switch response to the first and second signals output by said multivibrator.

6. An apparatus for monitoring and controlling the level of ice in an ice storage container, comprising:
   an emitter mounted within the ice storage container;
   a detector mounted within the ice storage container directly opposite from said emitter;
   a pulse circuit for applying a duty cycle signal to said emitter wherein said duty cycle signal permits the application of increased power to said emitter to increase the signal level of a pulse train output by said emitter; and
   a receiver circuit for outputting a signal responsive to the pulse train detected by said detector, said receiver circuit comprising:
      an amplifier for amplifying the pulse train signal detected by said detector,
      a multivibrator configured to output a first signal responsive to the input of the pulse train wherein, when said multivibrator fails to detect the pulse train for a predetermined time period, said multivibrator outputs a second signal, and
      a switch responsive to the first and second signals output by said multivibrator.

7. The apparatus according to claim 6 further comprising a controller that activates an ice maker responsive to the signal output from said receiver circuit.

8. The apparatus according to claim 6 wherein said pulse circuit comprises:
   a timer configured to generate a pulse train signal;
   an invertor for inverting the pulse train signal; and
   a power transistor for amplifying the pulse train signal.

9. The apparatus according to claim 6 further comprising:
   a second emitter mounted within the ice storage container;
   a second detector mounted within the ice storage container directly opposite from said second emitter;
   a second pulse circuit for applying a duty cycle signal to said emitter wherein said duty cycle signal permits the application of increased power to said emitter to increase the signal level of a pulse train output by said emitter; and
   a second receiver circuit for outputting a signal when said detector fails to detect the pulse train.

10. The apparatus according to claim 9 wherein said controller deactivates the ice maker responsive to the signal output from said second receiver.

* * * * *